Dec. 16, 1969   H. C. EDWARDS ET AL   3,483,604
TAPERED ROLLER BEARING CONE MAKING APPARATUS
Filed May 23, 1966   8 Sheets-Sheet 1

INVENTORS:
HERBERT C. EDWARDS
RONALD L. LYTLE
JOSEPH HABURN.
BY Gravely, Lieder & Woodruff
ATTORNEYS.

Dec. 16, 1969   H. C. EDWARDS ET AL   3,483,604
TAPERED ROLLER BEARING CONE MAKING APPARATUS
Filed May 23, 1966                               8 Sheets-Sheet 4

INVENTORS:
HEBERT C. EDWARDS
RONALD L. LYTLE
JOSEPH HABURN
BY Gravely, Lieder & Woodruff
ATTORNEYS.

Dec. 16, 1969        H. C. EDWARDS ET AL        3,483,604
TAPERED ROLLER BEARING CONE MAKING APPARATUS
Filed May 23, 1966                              8 Sheets-Sheet 6

INVENTORS:
HERBERT C. EDWARDS
RONALD L. LYTLE
JOSEPH HABURN
BY Gravely Lieder & Woodruff
ATTORNEYS INVENTORS:
HEBERT C. EDWARDS
RONALD L. LYTLE
JOSEPH HABURN
BY
Gravely, Lieder & Woodruff
ATTORNEYS.

United States Patent Office 3,483,604
Patented Dec. 16, 1969

1

3,483,604
TAPERED ROLLER BEARING CONE MAKING APPARATUS
Herbert C. Edwards, Canal Fulton, and Ronald Lee Lytle and Joseph Haburn, Canton, Ohio, assignors to The Timken Roller Bearing Company, Canton, Ohio, a corporation of Ohio
Filed May 23, 1966, Ser. No. 552,045
Int. Cl. B23b 7/14
U.S. Cl. 29—27                    9 Claims

ABSTRACT OF THE DISCLOSURE

An apparaus for manufacturing tapered roller bearing cones from elongated stock includes a boring tool and a turning bit which operate contemporaneously on the stock. The former is advanced axially for boring out the interior of the stock, while the latter is advanced both axially and transversely for roughing two ribs and a tapered raceway into the exterior of the stock. The apparatus further includes a breakdown tool and an undercut bit which advance simultaneously toward the stock in a transverse direction. The breakdown tool initiates a severance cut in the stock, while the undercut bit swings generally axially when it reaches a position in close proximity to the raceway, so as to undercut one of the ribs. A finish forming bit advances transversely of the stock and finishes the surfaces of the two ribs and the raceway. A dressing bit advances with the finish forming bit and finishes the end face of the stock. Finally, a cut-off tool advances into the stock at the cut initiated by the breakdown tool and severs the finished cone from the remainder of the stock.

This invention relates to the making of the inner race or cone members of antifriction bearings using tapered rollers.

In many antifriction bearings using tapered rollers, the inner race or cone member is provided with a large diameter rib, a small diameter rib and an intervening tapered raceway. These surfaces must be precisely formed and related, and normally require many machining operations of the different surfaces. Heretofore the apparatus utilized to make cones has been complicated and time consuming, with attendant expense which does not contribute to an economical way of making the cones. Ways have been developed for making the cups of tapered roller bearings in a single machine from tubing, but the operations are quite different and do not lend themselves to the making of cones.

It is an important object of this invention to provide unitary apparatus with components adapted to form the different surfaces of a cone in as nearly a simultaneous manner as possible, thereby resulting in certain economics and providing a less costly bearing part having great accuracy.

It is another object of this invention to provide single spindle apparatus of simple and rugged character for making antifriction bearing cones from tubing.

It is also an object of this invention to provide apparatus for making bearing cones in which the many different forming and finishing operations may be programmed in a simple manner and in operational cycles which follow in sequential steps.

Another object of this invention is to provide single spindle apparatus for making bearing cones from tubing having fewer parts of less complicated character than heretofore so that there is less strain in the parts while they are under load, and consequently there is less wear and less maintenance.

2

Yet another object of this invention is to provide apparatus which will substantially standardize the production equipment for making both cups and cones for antifriction bearings, thereby simplifying plant layouts and personnel understanding of the operational characteristics.

Other objects and advantages of the present invention will be set forth in more detail in connection with a preferred embodiment of the apparatus having parts and components contributing to the overall inventive merits of the improvements attained herein, and attention will be directed to the several views illustrated in the accompanying drawings, wherein:

In a preferred embodiment of the apparatus there is provided a suitable frame for a single spindle mechanism which has a hollow chuck head for receiving the tubular stock from which the tapered cones are to be made, and means for supporting the stock in position for rotation relative to the forming tools of the apparatus. The frame has a front face on which are operatively mounted in suitable slides the respective forming tools, and the apparatus has a drive consisting of suitable drum or barrel cams which operate linkages for advancing and retracting the various tools in timed sequence. There is incorporated a novel mechanism for performing substantially simultaneously the initial internal and external forming of the stock. including forming the tapered raceway for the roller bearings. All of the forming operations are performed on the stock while rotating in the single spindle or chuck, rather than as heretofore by having multiple spindles and indexing the work piece from station to station.

The foregoing and other details of the presently preferred apparatus will be set forth in greater detail in the following description and with reference to the accompanying drawings, wherein.

Figure 1:
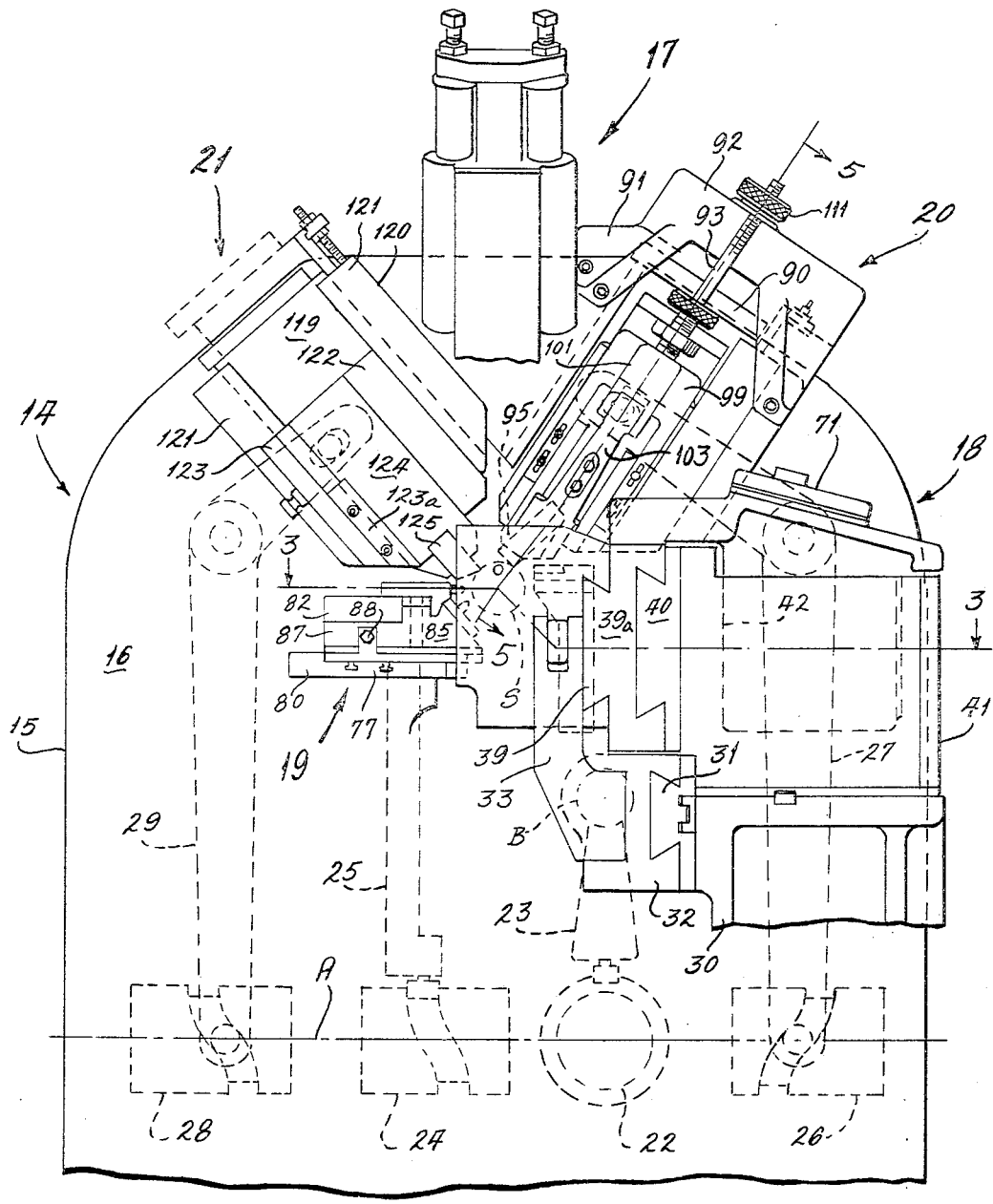
FIG. 1 is a front elevation view of the apparatus showing the relative positions of the components and parts, and showing in phantom outline one drive means for effecting movement of the various components.

In FIG. 1 the apparatus 14 includes a frame 15 having a front face 16 on which are supported the various forming tool operating means, such as the stock length measuring stop means 17 seen in fragmentary outline, the boring and taper turning tool means 18, the rib undercutting tool and breakdown tool means 20, the cone rib and taper finishing tool means 19, and the cutoff tool means 21. There is also shown the general arrangement of the various forming means above identified relative to the stock seen at S and the draw bar B. In addition there is schematically illustrated a means for operating the various tool means in the form of drum or barrel cams driven from a power represented by the axis A. Briefly, it can be seen that a power shaft A operates a series of cams. Cam 22 operates an arm 23 for moving the means 18, cam 24 operates an arm 25 for moving the means 19, cam 26 operates the crank 27 which moves means 20, and cam 28 operates lever 29 to move means 21. The shaft represented by axis A has a suitable bevel gear take-off (not shown) for driving a right-angularly arranged shaft carrying the drum or barrel cam 22 which operates crank 23 for reciprocating draw bar B in a direction parallel with the longitudinal axis of the tubular stock S.

It is, of course, understood that the machine 14 is provided with known means (not necessary to show) for advancing the stock S through a spindle chuck C (FIG. 3) and for rotating the stock at a predetermined speed to suit the cutting actions of the various tool means to be described presently. The drive means as represented by the power shaft A may be responsive to automatic controls so that the manufacture of the bearing cones (FIG. 6) can be put on a continuous and automatic schedule.

Figure 2:
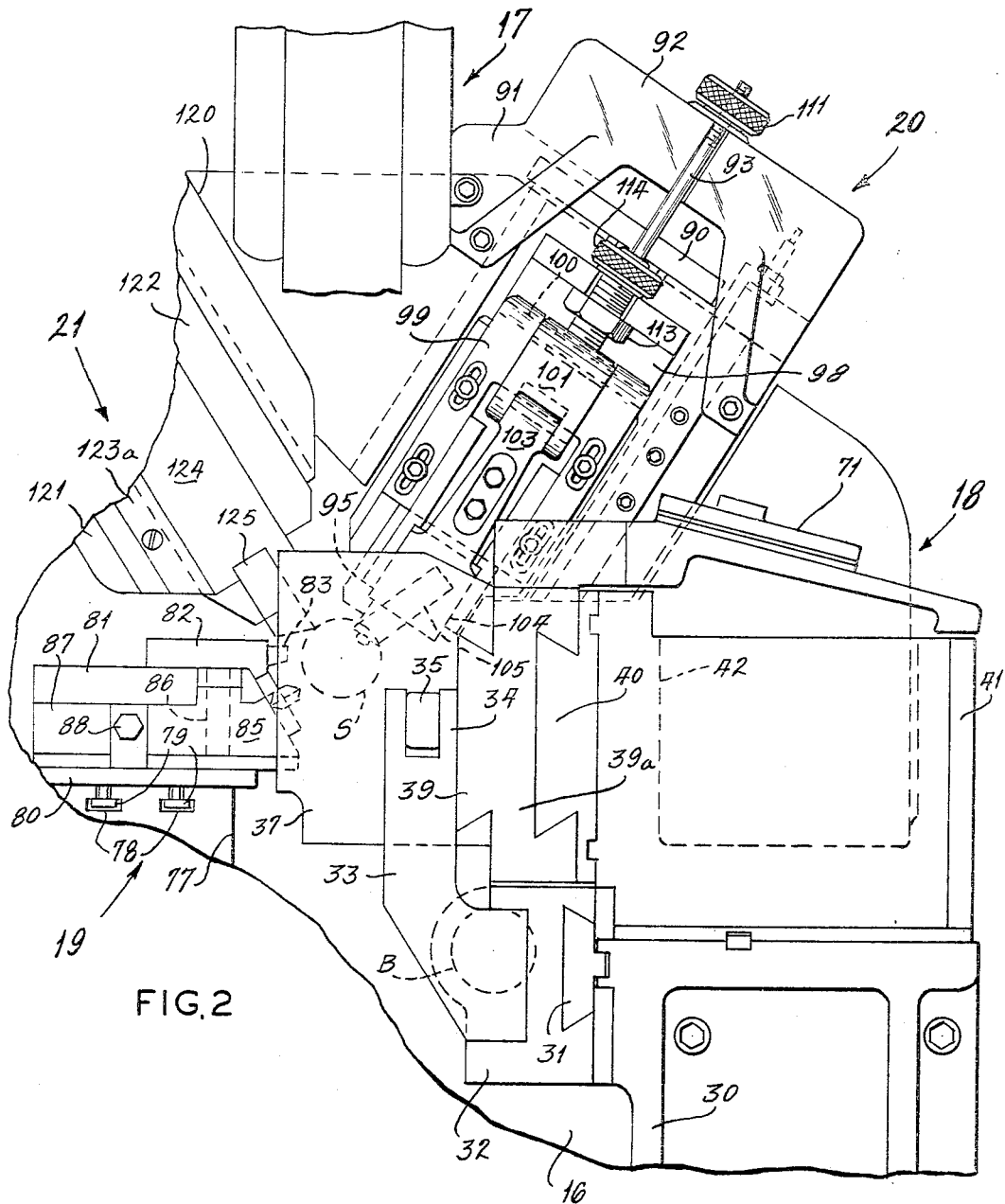
FIG. 2 is a greatly enlarged and fragmentary front elevational view of the apparatus seen in FIG. 1.
Figure 3:
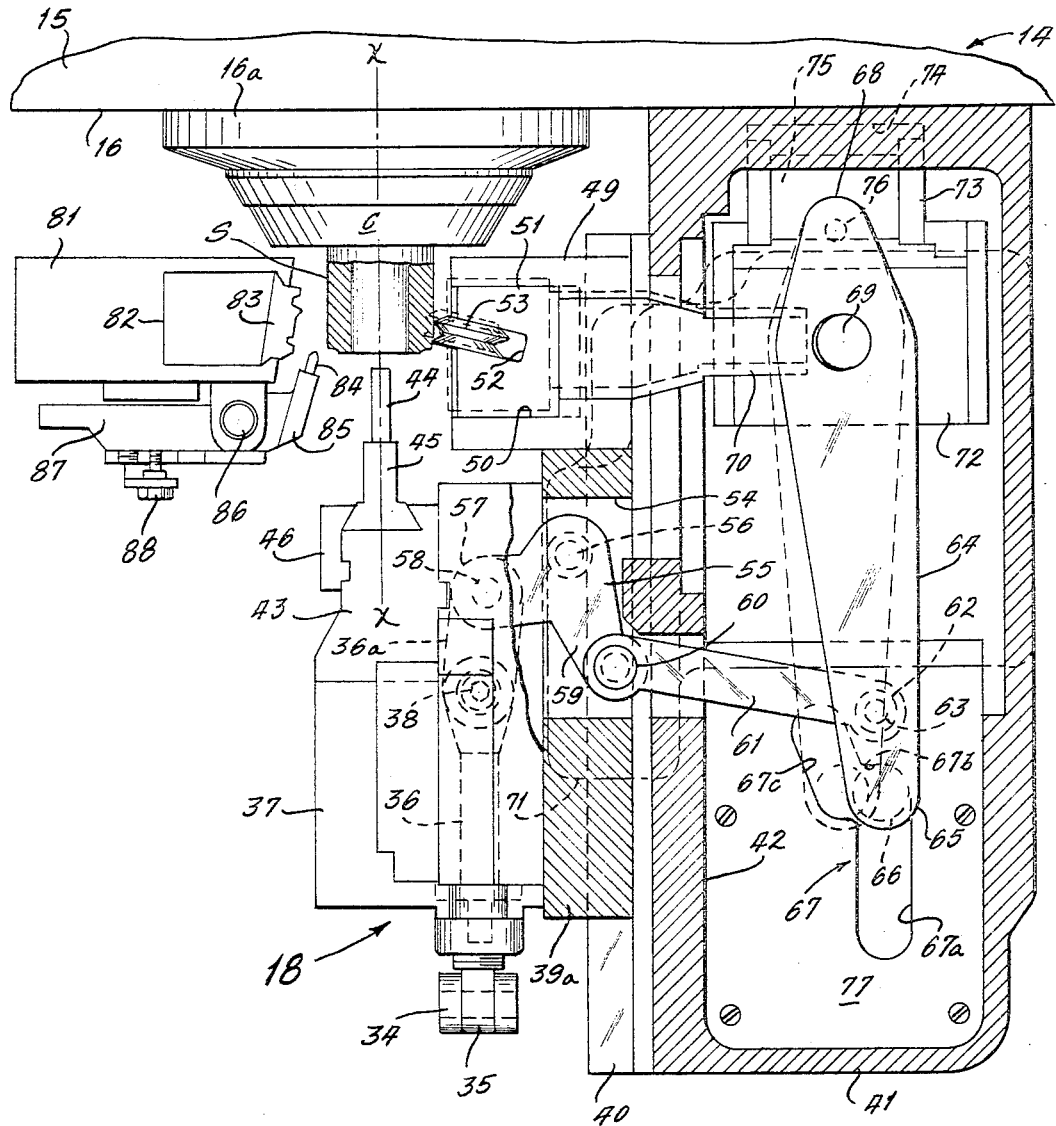
FIG. 3 is an enlarged fragmentary and partly sectioned plan view of the apparatus as seen along line 3—3 in FIG. 1, the view showing certain motions thereof.

Turning now to FIGS. 1–4 inclusive, it can be seen that means 18 is carried on a stationary bracket structure generally indicated at 30, which is attached to the front face 16 of the machine. The structure 30 carries a dovetail guide 31 which supports a slide 32 connected directly to the outer end of the draw bar B. The slide 32 carries an upwardly extending arm 33, which is connected at its upper bifurcated end 34 with the outer end 35 of horizontally extending link 36 (FIG. 3). The link 36 extends inwardly of a bore slide 37 (FIGS. 3 and 4) where its inner end is secured by a pin 38 to a push-pull link 36a. The bore slide 37 is suitably supported at one side on a dovetail guide 39 integral with or attached to and acting as a part of a turn slide 39a. The turn slide 39a may have movement independent of the bore slide 37 by being mounted on a dovetail guide 40, which is an integral part of or attached to a stationary turn tool control housing 41. The housing 41 is formed with an internal chamber 42 for a purpose which will be described presently.

Figure 4:
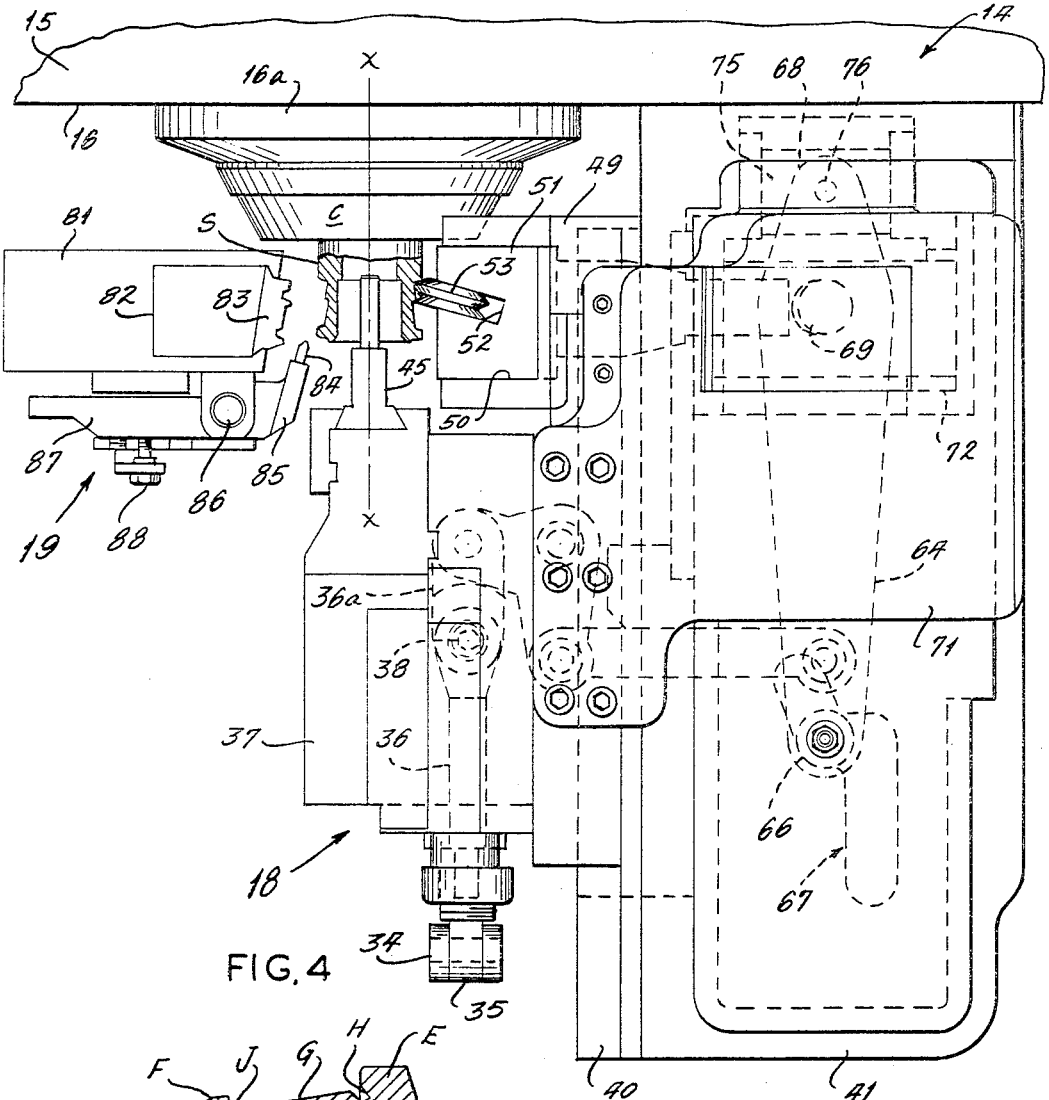
FIG. 4 is a view similar to FIG. 3 but illustrating the ending position of certain components of the apparatus.

As can be seen in FIGS. 3 and 4, the bore slide 37 has a tool holder block 43 which is attached to the leading side of the bore slide 37. The tool holder block 43 carries a suitable boring tool 44, which is mounted in a base 45 having a suitable base so that it can be secured to the tool holder block by a removable gib 46. As will be described in connection with the diagrammatic views of FIGS. 8 and 9, boring tool 44 is provided (at its underside as viewed in FIG. 3) with a radius cutting bit 48 which follows up on the boring bit 44a carried by the tool 44.

The turn slide 39a (FIG. 3) has a forward extension 49 which provides a cross-slideway 50 for a tool holder 51. The tool holder 51 is suitably notched at 52 to receive the turn tool bit 53. It will also be observed that the turn slide 39a intermediate its length is slotted at 54 so that a bellcrank 55 may be supported in the slot 54 on a suitable pin 56 fixed in slide 39a. The bellcrank 55 moves in a horizontal plane about the pin 56 and has one arm 57 connected by pin 58 to the link 36a. The arm 57 is also connected to the slide 37 so that the bellcrank 55 and slide 37 move to and fro contemporaneously. Another arm 59 of the bellcrank 55 is movable in the slot 54 of the turn slide 39a and has its end connected by a pin 60 to one end of a link 61. The outer end 62 of the link 61 is connected by a pin 63 to a motion controlling lever 64. The motion controlling level 64 has one end 65 provided with a roller element 66 which moves in a suitable cam slot 67. The lever 64 extends forwardly and along side of the turn slide 39a where its end 68 is supported by structure which will be described presently. Inwardly of the end 68 the lever 64 is provided with a pin 69 which secures one end of a push-pull member 70, the opposite end of which is suitably connected to the tool holder slide 51.

Since the turn tool bit 53 must have longitudinal movement, the turn slide 39a and the slideway 49 suitably support a frame partly represented by the cover member 71. The cover member 71 (Fig. 4) supports suitable mechanism 72 for movement within the frame 41. Mechanism 72 carries the pivot pin 69, as well as an extension 73 which slides in a recess 74 of the frame 41. The extension 73 carries a slide 75 of piston-type having a pin 76 which is connected to the end 68 of the motion controlling lever 64. Since the main pivot point of lever 64 is in the axis of pin 69, it can be seen that the end 68 of the lever will have some arcuate movement which is taken up by the sliding action of the piston slide 75, thereby preventing binding of the pivot points.

It can be understood that motion of lever 64 about the pivot 69 is responsive to the roller 66 moving in the cam slot 67. The cam slot 67 is formed in a cam plate 77 which is suitably and removably positioned in the frame 41. The cam slot 67 consists in a first straight section 67a, a right angular section 67b, and an angular or taper control section 67c. Obviously, the cam plate 77 is held stationary in the frame 41. It has already been noted that the turn slide 39a moves on the dovetail guide 40 which is attached to the frame 41, and that the bore slide 37 moves relative to the turn slide 39a on a dovetail guide 39.

Before describing the operation of the bore and turn slides and the motion controlling lever associated therewith, it should be noted that the machine 14 carries a suitable chuck mechanism C, which is rotatably mounted in bearing mechanism 16a projected forwardly of the front face 16 of the machine. It is not believed necessary to describe in detail the chuck mechanism C as any conventional type will suffice. The chuck mechanism C is attached to grip the stock S and to rotate the stock S about a longitudinal axis represented by the axial line X—X in FIGS. 3 and 4. A suitable length of the stock S is projected beyond the chuck C and is positioned by a stop mechanism which is only partially shown at 17 in FIG. 1. The parts just described are also shown in connection with FIG. 3, and in this latter view the bore and turn slides are shown in full line at a position where they have advanced toward the stock from the starting position. The starting position would normally be assumed with the roller 66 of the motion controlling lever 64 close to the outer end of the straight section 67a for the cam 67. In this position the boring tool 44 and the turning bit 53 would be fully retracted and free of the projecting portion of the tubular stock S.

Figure 7:
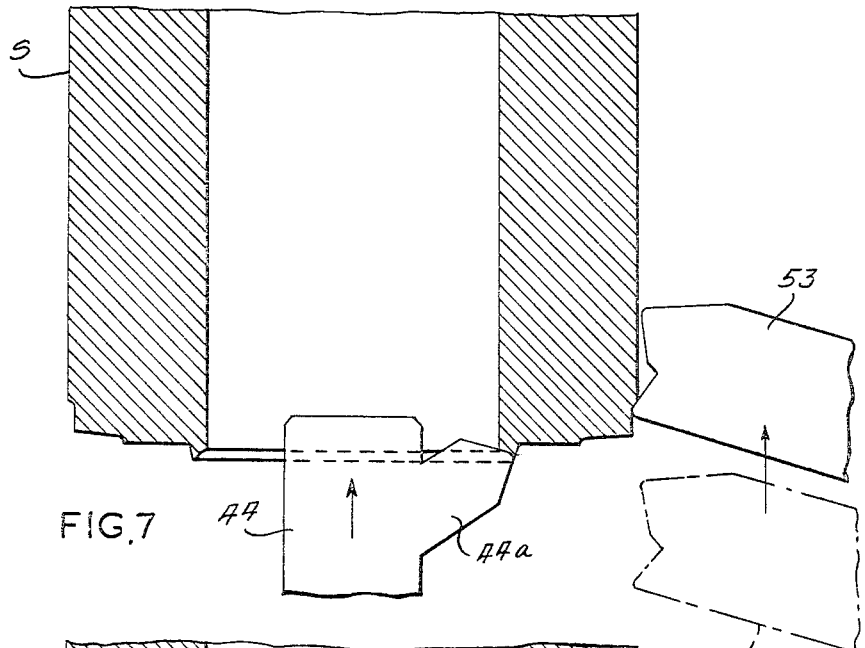
FIG. 7 is an enlarged schematic view of an initial stage in the forming operation on the rotating stock by the boring and taper turning tools.
Figure 8:
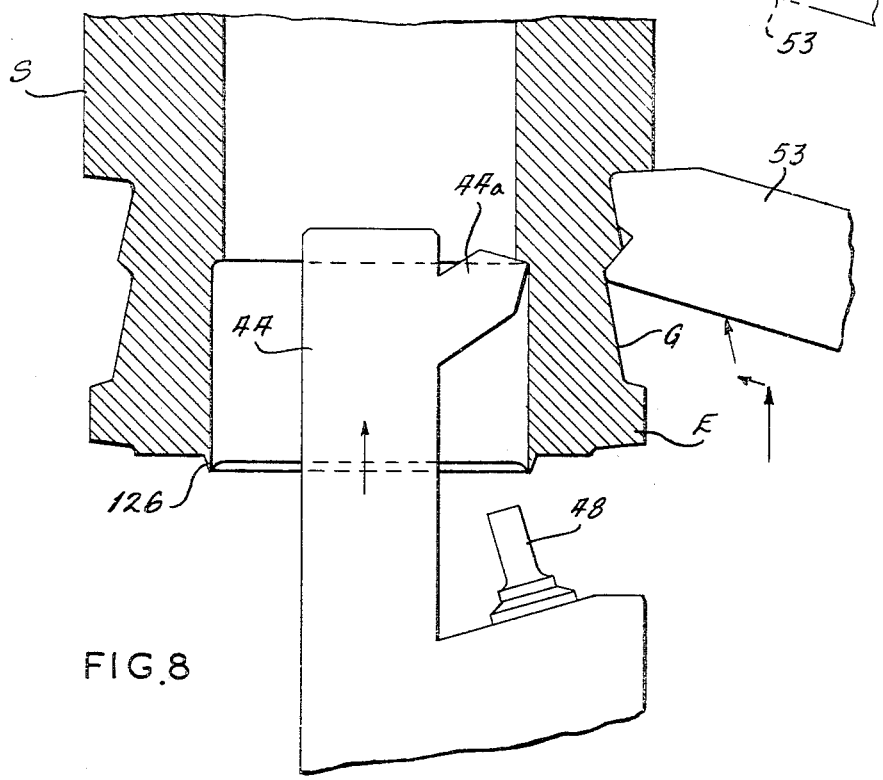
FIG. 8 is a view similar to FIG. 7, but at an intermediate stage in the forming operation.

The initial operation of the machine, as represented in FIGS. 3 and 7, and in more advanced stages as shown in FIGE. 8 and 9, is effected by longitudinal reciprocation of the draw bar B through the lever 23 and the power cam 22. The draw bar B moves arm 33 which applies power to the link 36. The link 36 has the push-pull link 36a connected between pivot pins 38 and 58, the pin 58 being in the arm 57 of bellcrank 55. Bellcrank 55 is held in a non-pivoting or immovable position by reason of the link 61 being connected between the pin 60 on arm 59 and pin 63 on the motion controlling lever 64. Since the roller 66 is confined within the cam section 67a, the bellcrank 55 is not permitted to rotate about its pin 56 which is secured in the turn slide 39a. As a consequence, the draw B will effect simultaneous movement of the bore slide 37 and the turn slide 39a which advances the boring tool 44 and the turning bit 53 relative to the stock S. The boring tool 44 enlarges the diameter of the bore in the stock S and the bit 53 initiates turning of the outside diameter of the large diameter shoulder for the bearing cone. The action is illustrated in FIGS. 7 and 8.

Figure 9:
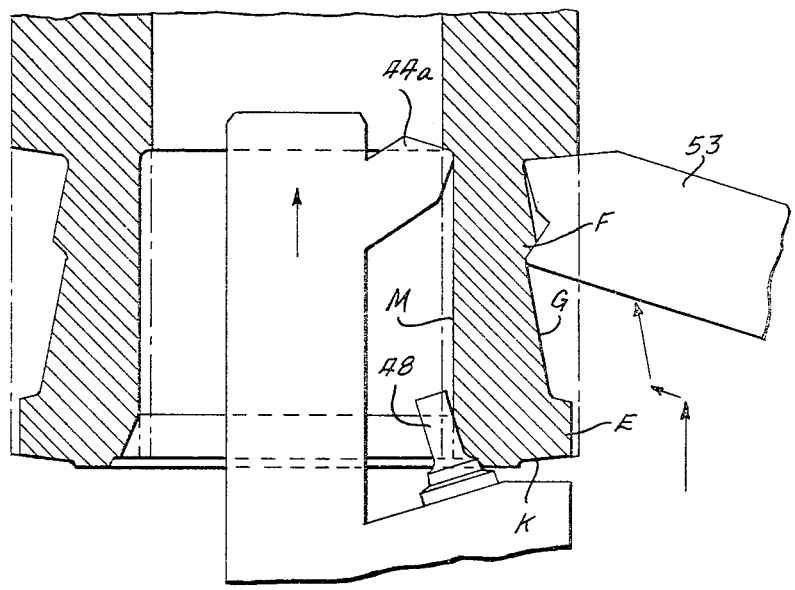
FIG. 9 is a view similar to FIG. 7, but at the completion of the forming of the bore and the rough turning of the tapered raceway.

When the roller 66 on the end 65 of motion controlling lever 64 reaches the junction of the right-angular section 67b and the straight section 67a of the cam slot 67, the lever 67 will be prevented from advancing longitudinally, but it will be free to move in a lateral (clockwise) direction about the pivot pin 69 because of the cam section 67b. As the motion controlling lever 64 is prevented from advancing longitudinally with the draw bar B, the bellcrank 55 is free to pivot about pin 56, thereby substantially arresting the forward motion of the turn slide 39a while permitting continued longitudinal movement of the bore slide 37. Thereafter, the bore slide 37 will advance relative to the turn slide 39a until the roller 66 reaches the junction between the right angular section 67b and the taper control section 67c. At this point the motion controlling lever 64 is again permitted to advance longitudinally with the bore slide 37, but because the roller 66 is now moving along the taper control section 67c of the cam slot 67, the motion controlling lever 64 will have a rate of longitudinal movement which is less than the movement of the bore slide 37. This differential motion is the result of having the lever 64 advance the bit 53 into the stock S on the cross-slide 51 as it also moves longitudinally so as to turn a tapered raceway in the cone. In this manner the bore and turn slides 37 and 39a, respectively, have a certain conjoint longitudinal movement, a certain differential movement in which one is for a time substantially stationary as for longitudinal movement, and a final period of movement where both are advancing longitudinally, but one advances relatively faster than the other. The various phases of movement above described begin at the same time and end at a common point on the stock S, which is at the smaller diameter rib end of the bearing cone. As illustrated in FIGS. 7, 8 and 9, the sequence of events is schematically illustrated. Once the turning of the bore and the rough turning of the ribs and tapered raceway on the stock S has been completed, the power cam 22 has reached its position where the lever 23 reverses the movement of the draw bar B for returning the boring tool 44 and the turning bit 53 to the starting positions. The stock S is thereby prepared for the next operations.

Figure 10:
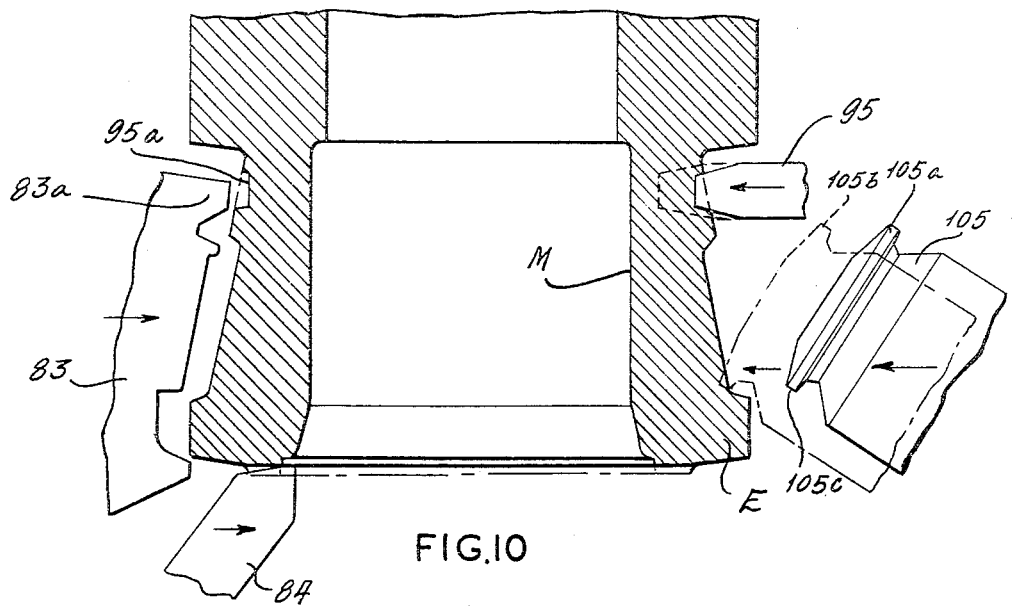
FIG. 10 is a schematic view of the operation for forming the rib undercut and for forming the breakdown of the stock in advance of cutoff.

The next operation on the stock S comprises dressing up the axial end face of the stock S and finish forming the surface of the ribs and raceway on the cone. Almost simultaneously the breakdown tool bit is actuated to remove excess stock so that the finish forming tool will have no interference, and the undercut bit acts at this time. The various operations will best be set forth in isolated descriptions first. Accordingly, it is observed that the finishing forming tool means 19 (FIGS. 2 and 3) comprises a suitable support structure 77 carried on the front face 16 of the machine 14. The support structure 77 (FIG. 2) is provided with a pair of T grooves 78 which receive suitable slide elements 79 attached to the base 80 of the finishing forming tool means 19. The means 19 also includes a slide block 81 which is operatively connected to the lever 25 operated by the power cam 24 (FIG. 1), and slide block 81 supports a tool holder 82 in which there is operatively mounted a finish forming bit 83. The shape of the finish forming bit 83 is shown in FIG. 10. Slide block 81 moves radially into and away from the position of the stock S, thereby advancing and retracting the bit 83. In order to effect dressing up of the outer end face of the stock which has now acquired the basic shape and size of a bearing cone, the means 19 is provided with a dressing bit 84 (FIG. 10) carried in a suitable holder 85 (FIG. 2) which is adjustably mounted on the block 81 by a pin 86. The tool holder 85 has a protecting arm 87 which is engaged by an adjustment screw 88 for angularly positioning the bit 84 about the pivot pin 86.

As indicated before there is close coordination of the operations of the various tools, such as the operation performed by the rib undercutting and breakdown tool means 20. The latter means 20 is shown in front view in FIGURES 1 and 2 and in greater detail in FIG. 5. The following description will be primarily directed to FIG. 5, with some references to FIGS. 1 and 2 where necessary. The means 20 is provided with a main breakdown tool slide 90 suitably mounted for reciprocating movement on the front face 16 of the machine 14. The front face 16 supports a bracket 91 having an upper projection 92 for receiving a control rod 93. The slide 90 at the end opposite the bracket 91 is provided with a suitable tool receiver 94 for receiving a breakdown tool 95 mounted in its holder 96. The main slide 90 is provided with a slideway to receive a dovetail guide 97 which is an integral part of slide block 98. The slide block 98 has relative movement on the slide 90 for a purpose which will appear presently. The slide block 98 is provided with a bracket 99 which carries a pivot pin 100 and a link 101 carried on the pin. The link 101 is connected at pin 102 to one end of a lever 103, and the opposite end of this lever is provided with a tool holder 104 to mount an undercut bit 105 (FIG. 10). As before noted, the control rod 93 is slidable in the part 92 of the bracket 91, the rod extending downwardly through a slotted projection 106 in the slide block 98 so that its lower end 107 can be threadedly connected with a block 108. The block 108 has a bifurcated lower end 109 which supports the pivot pin 110, thereby connecting the block 108 with the lower end of the lever 103. The action of the control rod 93 is suitably controlled as to its degree of movement by a thumb nut 111 at its upper end, and this sets the relative position of the member 108 on the slide block 98. A rod guide consisting of the sleeve 112 having a tool engaging nut 113 is formed intermediate the length of the sleeve 112. The sleeve portion 112a is threaded to receive the adjustment nut 114 which engages the part 106 on the slide 98. The sleeve portion 112b is threadedly engaged in a block 115 which, in turn, engages on the bracket 99. There is a cushion spring 116 between the end of the sleeve part 112b and the block 108.

Figure 5:
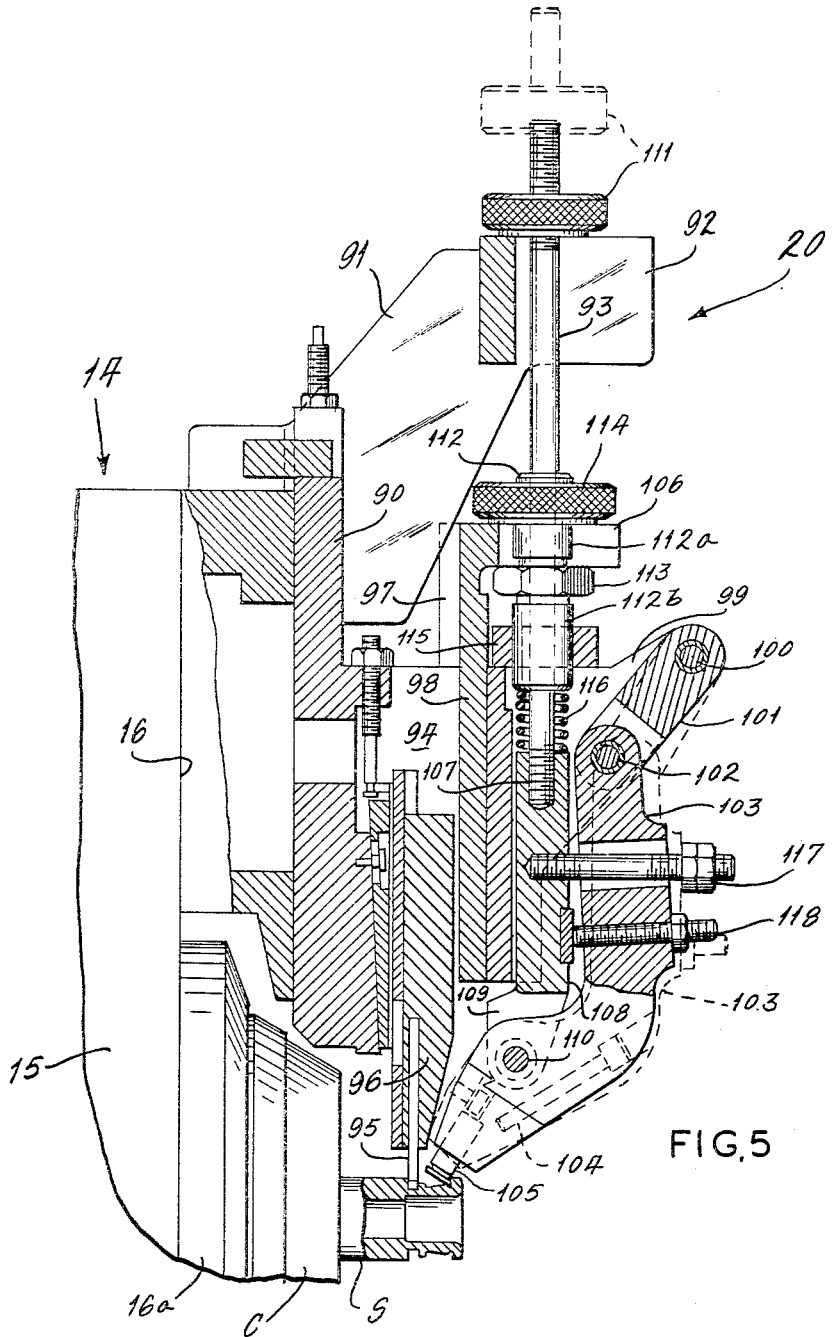
FIG. 5 is an enlarged fragmentary sectional view taken at line 5—5 in FIG. 1.

It is, of course, appreciated that the slide block 90 is given its initial movement by the cam 26 and actuating lever 27 (FIG. 1), thereby moving the entire assembly of parts shown in FIG. 5 with the block 90 relative to bracket 91. The bit 95 is thereby caused to initiate a radial cut into the stock S inwardly of the cone bearing part which is to be formed from such stock. Since the bracket 91 is fixed to the front face 16 of the machine 14, the movement of the slide block 90 will cause the control rod 93 to move from its dotted line position until the thumb nut 111 engages the projection 92 (full line position). When this happens, the pivot point 110 is prevented from advancing any further toward the stock S, but the slide block 98 is carried on down to compress the cushion spring 116, thereby moving the bracket 99 and activating the link 101 and lever 103 to pivot the lever about the pin 110 in a counterclockwise direction. Stop means 117 and 118 are provided to set the limits of lever motion. The pivoting movement of the lever 103 causes the undercut tool bit 105 to perform its undercutting function at the large diameter rib end of the bearing cone.

As seen in FIG. 5, when the rod 93 is arrested in its downward movement, there must be some way of permitting the slide block 98 to continue its downward movement, and for this purpose the rod 93 is slidably mounted so as to have relative movement with the element 108. The cushion spring 116 will permit yielding or relative movement between the element 108 and the slide block 98 so that the pivoting action of the lever 103 about the pivot pin 110 can take place. The moved position of the lever 103 is shown in the full line view of FIG. 5 and its normal inoperative position is shown in the broken line position in FIG. 5. The view of FIG. 10 shows schematically the function of the breakdown bit 95 and the undercut bit 105, both of which bits are bought into operation on the stock S by means of the mechanism shown in FIG. 5.

The final operation is to cut off the finished cone bearing member, and for this purpose the cutoff means 21 is provided on the front face 16 of the machine 14. Reference will be had to FIGS. 1 and 2 wherein the cutoff means comprises a main slide 119, suitably mounted in a guideway 120 provided with side elements 121. The sides 121 operatively guide means 122 and 123 for a tool block 124 which has mounted at its inner end a cutoff tool bit 125. The guide means 123 is complemented by a removable block 123a to allow removal of the tool block 124. The main slide 119 is operated by the lever 29 in conjunction with the cam 28.

It is now believed understood that in the arrangement of a single spindle for rotating the stocks (which rotates in a counterclockwise direction as viewed in FIG. 1) the various forming tools are arranged and designed so that the initial boring and turning removes a substantial amount of the material from the tubular stock. This rough cutting occurs at a time when the stock is strong enough to resist the pressure of the cutting bits without distorting and resulting in misshaped parts. Subsequent operations of various cutting bits entails a considerably reduced amount of material removal which speeds up the total operation and reduces the chance for deforming the stock and producing eccentrically shaped bearing cones. As is described above, during the undercutting operation at the large diameter end of the bearing cone, a breakdown tool 95 is utilized to initiate the cutoff of the finished part, and the action of the undercut bit 105 is believed to stabilize the position of the cone member during the action of the breakdown tool 95. The breakdown tool 95, thereby, leaves a thin annular web of material to be cut through by the cutoff tool bit 125.

SEQUENCE OF OPERATION

Figure 6:
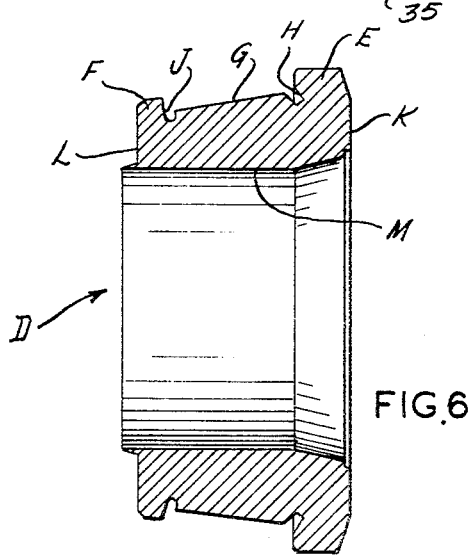
FIG. 6 is a longitudinal sectional view of the finished cone member made on the present apparatus.

It has been heretofore pointed out that the object of the improvement herein is to be able to make bearing cones for antifriction tapered roller bearings on a single spindle machine from tubing. The machining of the different surfaces found on the cone, as depicted in FIG. 6, must be done as nearly simultaneously as possible in order to make such a machine practical. As shown in FIG. 6, the bearing cone D has a large diameter rib E, a small diameter rib F, and an intervening tapered bearing raceway G. There is an undercut H at the large rib end E of the raceway G, and there is a stress relief groove J at the small diameter rib end F of the raceway. The cone member also has a large rib end face K and a small rib end face L. Since the bearing cone D is to be made from tubing, it has an innerbore M which is a cylinder. For practical consideration, some of the forming operations of the various surfaces above-described may be done during the same sequence or cycle of machine operation, and other operations may be done during either the first or second parts of the same cycle as will hereinafter be described. It is of primary importance that as each sequence takes place a minimum amount of metal remains to be cut by the next following tool. Stated differently, the amount of material removal decreases with succeeding tools by utilizing the preceding tools to clear the way. In the case of a bearing cone made from tubular stock, the greatest amount of material is to be removed from the outside diameter of the tubular stock S because of the necessity for a tapered raceway G and the large and small diameter ribs E and F.

Looking now at FIGS. 7, 8 and 9, it is noted that the stock S is initially engaged on the outside diameter by the turn bit 53 which initiates a rough forming cut somewhat in advance of the start of the internal bore by the bit 44a of the boring tool 44. An initial position of the tool bits 53 and 44a is shown in FIG. 7 relative to the stock S. None of the other forming tools is at this stage brought into cutting operation on the stock S. FIG. 8 illustrates a position of the turning bit 53 after it has rough turned the large rib E on the bearing cone, as well as rough turned the tapered raceway G. It is observed in comparing FIGS. 7 and 8, that the boring bit 44a, while starting off trailing the turn bit 53 as in FIG. 7, eventually catches up with the turn bit 53 as in FIGS. 8 and 9 so that the bore M for each bearing cone D is completed at the time the turn bit 53 has advanced to its end position where it has started to leave material to form the small diameter rib F. It is also noted in FIG. 9 that near the completion of the inward stroke of the boring bit 44a, a radius cutting bit 48 has moved into the end face K of the stock to finish the end of the bore M and remove any fins or rough surfaces that might have been left by the previous action of the cutoff tool, to be described in connection with FIG. 12.

It is, of course, understood how the action of the turn bit 53 is controlled in relation to the boring bit 44a, this operation having been described in connection with FIGS. 3 and 4. In one preferred form the draw bar B was given a constant rate of linear speed per revolution of the chuck C for the stock S. This was roughly .016 inch per revolution. The constant linear movement of the draw bar B, therefore, initially was transferred to the turn bit 53 in a 1 to 1 ratio during the roller 66 (in the end of the motion controlling lever 64) travel in the straight section 67a of the cam slot. When the roller 66 entered the juction with the cam slot section 67b, the linear motion ceased and right angular motion began for the purpose of forming of the inner margin of the large diameter rib E. The turn bit 53 at this time moved radially into the stock, roughing out a considerable amount of material. The rate of radial movement of the turn bit 53 dropped to approximately .005 inch per revolution. As the roller 66 on the motion controlling lever 64 reached the tapered cam section 67c, the turn bit 53 began forming the tapered raceway G. Here again a considerable amount of material had to be rough cut from the stock S, but because of the character of the cutting surfaces on the turn bit 53 the rate of linear movement longitudinally of the stock S could be increased to approximately .010 inch per revolution. Of course with different dimensional characteristics for the bearing cone D, it will be necessary to adjust the rate of feed of the various cutting tools as well as the rate of rotation of the stock S by the chuck C.

Figure 11:
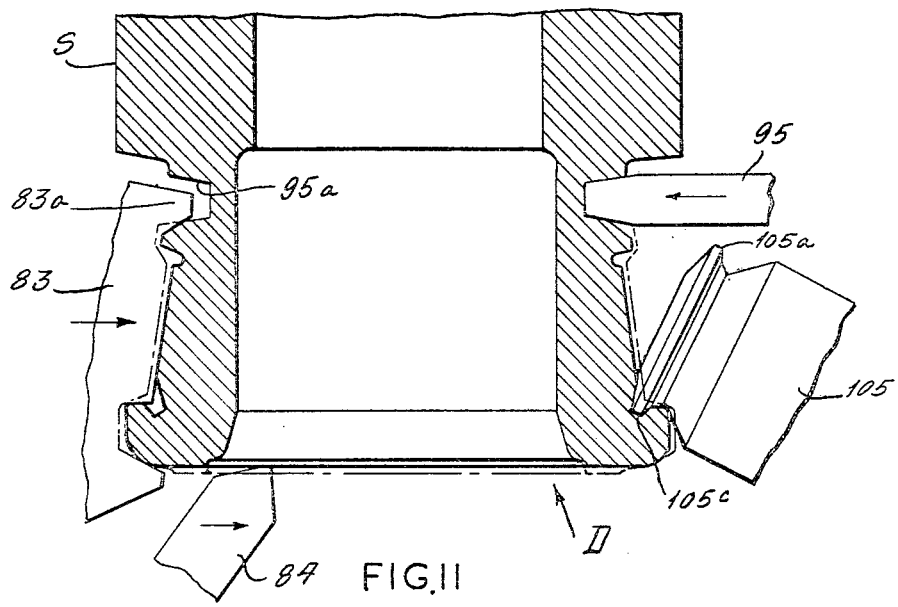
FIG. 11 is an enlarged schematic view of the tools for finish turning the cone prior to its cutoff.

Turning now to FIGS. 9 and 10, it is to be noted that the tool means 19 and 20 shown in FIG. 1 are brought into the stock S in a very closely coordinated sequence so that certain cutting bits are working on one side of the stock while other cutting bits are working on the opposite side of the stock. In this coordination of the sequences shown in FIGS. 10 and 11, the first cutting bit to engage the stock is bit 84 on the tool means 19, as this bit must complete dressing off the end face K for the final bearing cone D.

The next cutting bits that engage the stock S are the finish forming bit 83 and the breakdown bit 95. It is noted that the finish forming bit 83 removes a thin layer of material from the stock S to impart the finished profile for the large and small ribs E and F respectively, the raceway G, and the stress relief groove J. The bit 83 at its inner end has an annular rib 83a which lends rigidity to the bit but is not intended to do any cutting. Therefore, the breakdown bit 95 must be closely sequenced to effect removal of material from the stock S in the annular grooved area 95a so that the rib 83a on the finish forming bit 83 will not encounter an obstruction. The turning action of the breakdown bit 95 can therefore take place slightly in advance of the cutting action of the finish forming bit 83, so that the annular groove 95a coninues to enlarge radially inwardly in advance of the rib 83a of the finish forming bit.

As the finish forming bit 83 leaves the inner limits where the desired material is removed to complete the profile of the bearing cone D, the tool means 20 which controls the action of the breakdown bit 95 has advanced in toward the stock S to complete the annular groove 95a. Before any of the tool means is withdrawn from the stock, the undercut bit 105 is rendered operative and is caused to swing by the mechanism shown and described in connection with FIG. 5, from the full line position 105 of FIG. 10 to this broken line position, and to the position of FIG. 11. This arcuate movement of the undercut bit 105 is necessary in order to permit the cutting lip 105c to clear the inner radial surfaces of the large diameter rib E. On retraction of the tool means 20, the undercut bit 105 is first swung to its retracted position (full line in FIG. 5) before the breakdown bit 95 can be retracted to a position free of the stock S.

Figure 12:
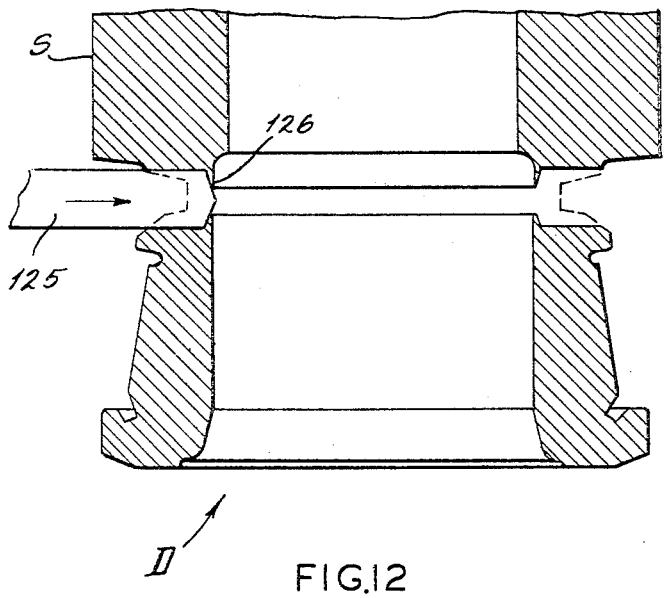
FIG. 12 is a schematic view of the cutoff tool for separating the finished cone from the stock.

FIG. 12 shows the final cutoff operation in which the cutoff bit 125 under the control of the tool means 21 has been caused to advance radially into the stock to sever the finished bearing cone D on the tubular stock S. In the severing action the cutoff bit leaves an annular fin 126 on the outer end of the stock S. The fin 126 is removed by the action of the radius cutting bit 48, as is shown in FIG. 9; and the annular fin element 126 may also be seen in connection with the disclosure of FIGS. 7 and 8.

Returning again to FIGS. 5 and 10, it is pointed out that the nut 111 on control rod 93 in tool means 20 is adjustable so that substantially 90% of the linear stroke of the rod 93 can take place without the nut 111 engaging the projection 92. This leaves substantially 10% of the linear movement of the mechanism in FIG. 5 for effecting relative movement between the bracket 99 and the now stationary pivot pin 110, whereby the link 101 and lever 103 will relatively collapse and cause angular displacement of the lever 103. The angular displacement of this lever actuates the undercut bit 105 as before described. The initial cutting action of the bit 105 is approximately .007 inch per revolution in the initial angular swing thereof, but as the swing progresses the rate of advance diminishes until at the end of the undercut the movement is approximately .003 inch per revolution. Lessening of the rate of feed is desirable near the end of the undercut operation because as the undercut progresses, the amount of material is continually increasing which imposes a heavier cutting load on the bit 105, and reduced speed is therefore salutary to the efficient cutting action and long life of such a bit.

From the foregoing it can be seen that the present improvement fully and completely carries out each and every object of the invention hereinafter to be claimed. It is, of course, appreciated that changes and modifications may be made after the preferred form of the invention is fully understood, and it is intended that all changes and modifications are to be included wherever possible in the claims hereinafter appearing.

What is claimed is:

1. In apparatus for producing from tubular stock a tapered roller bearing cone with large and small diameter ribs and an intervening tapered raceway, the combination including: a rotary spindle to support and rotate the tubular stock about a longitudinal axis; a plurality of stock cutting tools grouped about the tubular stock adjacent said rotary spindle; said stock cutting tools including a first group of tool bits movable relative to said spindle in both longitudinal and transverse directions, and other groups of tool bits movable relatively transversely of said spindle; a source of power in the apparatus for actuating said stock cutting tools; and motion imparting means between said source of power and said first group of tool bits to effect the longitudinal and transverse motions for said first group of tool bits, said motion imparting means comprising a fixed cam, a pair of longitudinally movable slides, a transversely movable slide carried by one of said longitudinally movable slides, said slides mounting said first group of tool bits, a motion controlling member engaging in said cam and operatively connected to said transversely movable slide, and motion transmitting elements connected between said source of power and said motion controlling member to effect displacement of said pair of slides and the transversely movable slide conjointly and differentially.

2. In apparatus for producing from tubular stock a tapered roller bearing cone with large and small diameter ribs and an intervening tapered raceway, the improvement comprising: a boring tool for sizing the internal diameter of the cone; a profiling shaping tool to rough shape the ribs and raceway of the cone; first means supporting and moving said boring tool longitudinally of the stock; second means moving said profiling tool longitudinally of the stock; third means on said second means movable relatively thereto in a direction transversely of the stock, said third means supporting said profiling tool; a bellcrank pivoted on said second means and having one arm connected to said first means and an opposite arm; a fixed control cam having a first section, a right angular section and a tapered section; a motion controlling member operatively carried by said second means in position to have a follower element thereon movable in said control cam and a connection to said third means; a link connected between said motion controlling member and said opposite bellcrank arm so that said bellcrank is locked against pivoting when said follower element is engaged with said first cam section and said first and second means are connected for conjoint movement for internal boring and shaping of the large rib, said follower element being movable in said right angular cam section to allow bellcrank pivoting for allowing motion of said first and third means relative to said second means for internal boring and shaping of the large rib and being movable in said taper cam section for allowing conjoint movement of said first and second means simultaneously with motion of said third means for internal boring and shaping of the tapered raceway and small rib; and a source of power connected to said first means.

3. In apparatus for producing from tubular stock a tapered roller bearing cone having large and small diameter ribs and an intervening tapered raceway, the improvement including a frame having a front face; rotary chuck means in said frame adjacent said front face; a slide assembly operably carried by said front face, said slide assembly having a breakdown cutting tool holder movable toward and away from the stock and providing a first pivot point, a motion controlling member movably mounted on said breakdown tool holder providing a second pivot point spaced from said first pivot point, a link connected at one end to said first pivot point, a lever connected intermediate its ends to said second pivot point and having one end interconnected with the opposite end of said link between said pivot points; a rib undercutting bit mounted in the opposite end of said lever and projecting toward the stock adjacent said breakdown tool holder; and means operably connected between said frame and motion controlling member to limit the movement thereof to less than the movement of said breakdown tool holder to cause relative movement of said link and lever to swing said undercutting bit about said second pivot point.

4. An apparatus for machining stock into a tapered roller bearing cone having large and small diameter ribs and an intervening tapered raceway; said apparatus comprising a chuck for holding and rotating the stock, a boring tool for boring out the interior of the stock so as to form a bore therein, a turning bit for rough turning the exterior of the stock, a first feed means for advancing the boring tool axially with respect to the stock and the turning bit both axially and transversely in pretimed relation to and contemporaneously with the boring bit such that the two ribs and the tapered raceway are roughed into the stock, a finish forming bit for finishing the exterior surface roughed in by the turning bit, second feed means for moving the finish forming bit transversely after the turning bit has roughed in the exterior surface, an undercut bit for undercutting the large rib at its juncture with the raceway, third feed means for moving the undercut bit transversely with respect to the stock and then generally axially into the large rib formed by the turning bit, a cutoff tool bit for cutting off that portion of the stock shaped into a bearing cone by the boring tool, turning bit, finish forming bit and undercut bit, and fourth feed means for advancing the cutoff tool bit transversely with respect to the stock.

5. An apparatus according to claim 4 and further characterized by a breakdown tool preceding the cutoff tool bit in the sequence of operation for cutting partially into the stock at substantially the same location at which the cutoff tool bit engages the stock, the third feed means advancing the breakdown tool transversely in pretimed relation to the transverse and axial movements of the undercut bit.

6. An apparatus according to claim 5 wherein the third feed means includes a slide shiftable transversely with respect to the stock, a lever pivoted on the slide in outwardly spaced relation to the stock for limited arcuate movement, the undercut bit being mounted on the lever adjacent to the stock so that when the lever pivots the undercut bit will move generally axially with respect to the stock, and means for pivoting the lever in pretimed relation to the advance of the breakdown tool.

7. An apparatus according to claim 4 wherein the third feed means includes a slide shiftable transversely with respect to the stock, a lever pivoted on the slide in outwardly spaced relation to the stock for limited arcuate movement, and means for pivoting the lever in timed relation to the advance of the slide, the undercut bit being mounted on the lever adjacent to the stock so that when the lever pivots the undercut bit will move generally axially.

8. An apparatus according to claim 4 and further characterized by a dressing bit for finishing the outer end of the large rib, the dressing bit being advanced across the end of the stock by the second feed means.

9. In apparatus for producing from tubular stock a tapered roller bearing cone with large and small diameter ribs and an intervening tapered raceway, the combination including: a rotary spindle to support and rotate the tubular stock about a longitudinal axis; a plurality of stock cutting tools grouped about the tubular stock adjacent said rotary spindle; said stock cutting tools including a first group of tool bits movable relative to said spindle in both longitudinal and transverse directions, a rib undercutting bit, and levered means on the apparatus for advancing the rib undercutting bit transversely into said stock and for swinging said undercutting bit in an arcuate path into the tubular stock to undercut one of the ribs on the bearing cone adjacent the tapered raceway; a source of power in the apparatus for actuating said stock cutting tools; and motion imparting means between said source of power and said first group of tool bits to effect the longitudinal and transverse motions for said first group of tool bits.

References Cited

UNITED STATES PATENTS

| | | | |
|---|---|---|---|
| 1,865,528 | 7/1932 | Lovely | 82—2 |
| 2,326,467 | 8/1943 | Kvehn | 82—25 |
| 2,691,312 | 10/1954 | Stewart | 82—11 XR |

FOREIGN PATENTS

| | | |
|---|---|---|
| 1,111,598 | 11/1955 | France. |
| 1,131,967 | 6/1962 | Germany. |

LEONIDAS VLACHOS, Primary Examiner

U.S. Cl. X.R.

82—2, 25